United States Patent Office 3,766,264
Patented Oct. 16, 1973

3,766,264
PROCESS FOR RESOLVING 2-(2β-BENZYLOXY-METHYL-3α-HYDROXY - 4 - CYCLOPENTENE-1α-YL)ACETIC ACID
Thomas K. Schaaf, Old Lyme, and Thomas J. Daniels, Waterford, Conn., assignors to Pfizer Inc., New York, N.Y.
No Drawing. Filed Mar. 2, 1971, Ser. No. 120,315
Int. Cl. C07c 65/14
U.S. Cl. 260—520       2 Claims

ABSTRACT OF THE DISCLOSURE

A process for resolving 2-(2β-benzyloxymethyl-3α-hydroxy-4-cyclopentene-1α-yl)acetic acid which comprises fractionally crystallizing the (+)-amphetamine salt of said acid from isopropyl ether and a solvent selected from chloroform, methylene chloride, or acetonitrile.

BACKGROUND OF THE INVENTION

This invention relates to the resolution of 2-(2β-benzyloxymethyl-3α-hydroxy-4-cyclopentene - 1α-yl)acetic acid into its optically active components. Said resolved compounds serve as key intermediates in the Corey syntheses of prostaglandins.

The syntheses of prostaglandin $E_1$ in its optically active form constituted a notable achievement by E. J. Corey and his associates (J. Amer. Chem. Soc. 91, 535 (1969)). Their synthetic sequences are particularly characterized by mild and specific reaction conditions. Further progress in prostaglandin research was severely encumbered by the lack of a facile, versatile, and commercially feasible synthesis for the optically active forms of $PGE_2$ and other natural prostaglandins such as $PGE_1$, $PGF_{2\alpha}$, $PGF_{1\alpha}$, $PGA_2$, and $PGA_1$.

SUMMARY OF THE INVENTION

The present invention comprises a process of resolving 2-(2β-benzyloxymethyl-3α - hydroxy - 4 - cyclopentene-1α-yl)acetic acid by fractionally crystallizing the (+)-amphetamine salt of said acid from isopropyl ether and another solvent selected from chloroform, methylene chloride, or acetonitrile. The ratio of said isopropyl ether to the other solvent may be from about 1:5 to 5:1, with the preferred ratio being about 3:2. It is to be understood that the amphetamine salt may be readily reconverted to the optically active free acid by standard means.

As is well known, members of the family of naturally occurring prostaglandins, and analogues thereof, have exhibited valuable therapeutic properties in control of fertility, hypertension, pulmonary disorders, peptic ulcers, and thrombosis.

DETAILED DESCRIPTION OF THE INVENTION

The 2 - (2β - benzyloxymethyl - 3α-hydroxy-4-cyclopentene-1α-yl)acetic acid is resolved by fractionally crystallizing the (+)-amphetamine salt of said acid from a specific solvent system consisting of isopropyl ether and another solvent selected from chloroform, methylene chloride, or acetonitrile.

In accordance with a preferred embodiment of the invention, the racemic acid is first dissolved in chloroform, methylene chloride, or acetonitrile, e.g. with heating at reflux temperatures. To this solution is added (+)-amphetamine, preferably in substantially equimolar ratio.

Isopropyl ether is then added to the mixture. The still warm solution is then seeded with resolved (+)-amphetamine salt and cooled. The resulting solid is filtered and washed with isopropyl ether.

In the event that the resulting product still contains detectable quantities of the undesired isomer, the partially resolved solid may be dissolved in chloroform, methylene chloride, or acetonitrile, heated to reflux, and more isopropyl ether added. Crystallization of the purified product may then be effected as before.

The (+)-amphetamine salt may subsequently be reconverted to the optically active free acid by solution in water, acidification with hydrochloric acid, and extraction into ether.

The following examples are given by way of illustration and are not intended to depart from the spirit and scope of the appended claims.

Example I

A 106-g. (0.405 mole) portion of the racemic 2-(2β-benzyloxymethyl-3α-hydroxy - 4 - cyclopentene - 1α-yl) acetic acid was dissolved in 3.21 l. of chloroform (B and A Reagent) and heated at reflux. To the solution was added 54.7 g. (0.405 mole) of (+)-amphetamine followed by 5.02 l. of isopropyl ether (Aldrich Reagent). The warm solution was seeded with resolved (+)-amphetamine salt and let cool overnight. The resulting solid was filtered, washed with isopropyl ether, and dried. The solid weighed 91.7 g. (114% yield of resolved salt), melted at 96.5–104°, and gave an $[\alpha]_D^{25}= +8.14°$ (c. 1.17, MeOH). The partially resolved solid was dissolved in 1.83 l. of chloroform, (B and A Reagent) heated at reflux, and 2.75 l. of isopropyl ether (Aldrich Reagent) were added. The warm solution was seded with resolved (+)-amphetamine salt and cooled overnight. The resulting dried solid weighed 53.7 g. (66.8% yield). melted at 109.5–110.5°, and afforded an $[\alpha]_D^{25}= +15.5°$ (c. 1.07, MeOH).

This procedure is repeated in separate experiments substituting methylene chloride and acetonitrile for chloroform, with equivalent results. Such results are likewise obtained substituting the following solvent volumes for those employed here:

| Solvent | Solvent volume, cc. | Isopropyl ether volume |
|---|---|---|
| Chloroform | 20 | 30 |
| Do | 5 | 25 |
| Do | 25 | 5 |
| Methylene chloride | 30 | 20 |
| Do | 5 | 25 |
| Do | 25 | 5 |
| Acetonitrile | 20 | 30 |
| Do | 5 | 25 |
| Do | 25 | 5 |

What is claimed is:
1. The process of resolving 2-(2β-benzyloxymethyl-3α-hydroxy-4-cyclopentene-1α-yl)acetic acid which comprises reacting said acid with (+)-amphetamine, fractionally crystallizing the (+)-amphetamine salt of said acid from a mixture of isopropyl ether and a solvent selected from the group consisting of chloroform, methylene chloride, and acetonitrile, said isopropyl ether and said solvent be- ing employed in a volume ratio of from about 1:5 to 5:1 and acidifying to obtain the optically active acid.

2. The process of claim 1 wherein said ratio is about 3:2.

References Cited

Corey et al.: J. Am. Chem. Soc. 91, 5675 (1969).
Corey et al.: J. Am. Chem. Soc. 93, 1489 (1971).
Ramwell et al.: Ann. of N.Y. Academy of Science, vol. 180, pp. 24–37 publ. 4/30/71 presented September 17–19, 1970.
Vogel: "Pract. Org. Chem." Wiley and Sons, pp. 163–165 (1962).
Fieser et al.: "Reagents for Organic Synthesis," pp. 1109–1110 Wiley and Sons (1967).
Eliel: "Stereochemistry of Carbon Compounds," McGraw-Hill Co., N.Y. (1962), pp. 47–53.

LORRAINE A. WEINBERGER, Primary Examiner

J. F. TERAPANE, Assistant Examiner

U.S. Cl. X.R.
260—501.1